Aug. 14, 1928.
S. G. JOHNSON
1,680,993
TIE BAND SECURING DEVICE FOR TRUNKS AND THE LIKE
Filed Sept. 1, 1927
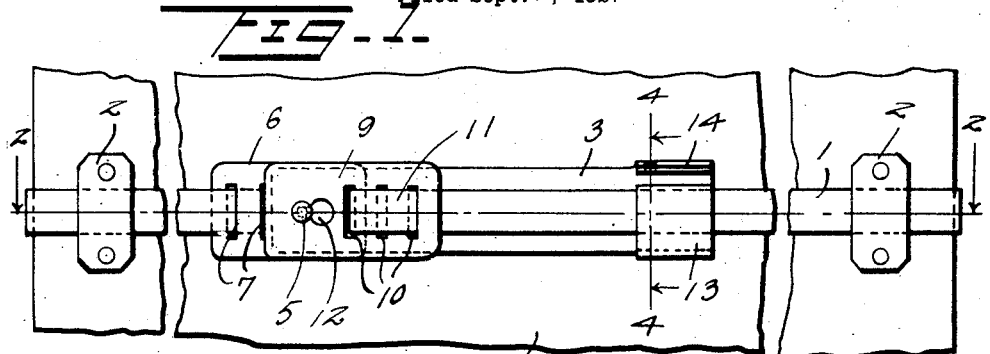
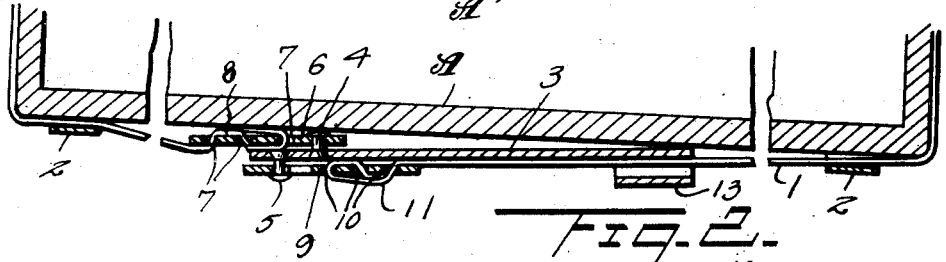
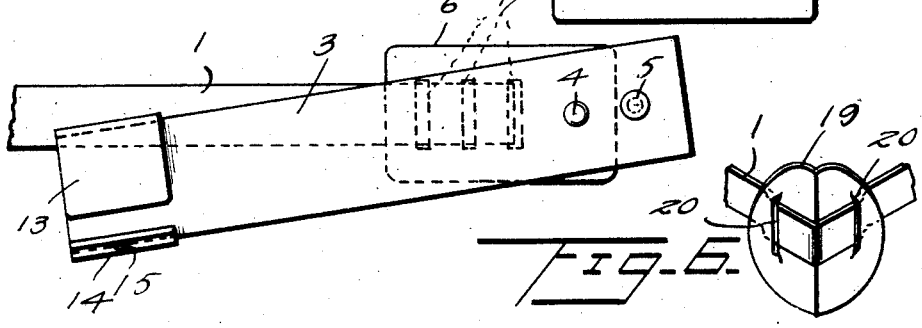
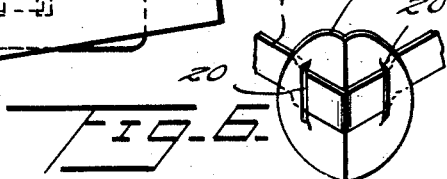
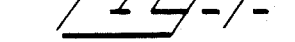
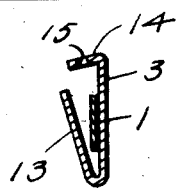
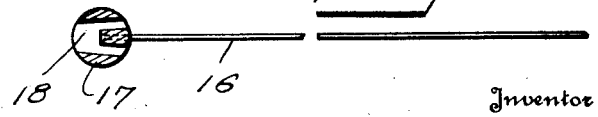
Inventor
S. G. Johnson
By L. F. [signature]
Attorney Patented Aug. 14, 1928.

1,680,993

UNITED STATES PATENT OFFICE.

SAMUEL G. JOHNSON, OF TUCSON, ARIZONA.

TIE-BAND-SECURING DEVICE FOR TRUNKS AND THE LIKE.

Application filed September 1, 1927. Serial No. 216,917.

The invention relates to means for securing the ends of tie bands for trunks, suit cases and other luggage, crates, boxes, etc., and has for its object the provision of means to secure a trunk or other receptacle in closed position and to do away with the unsatisfactory practice of roping or strapping trunks.

A further object of the invention is the provision of a tie band securing device for the purpose stated including a tie band of steel or other metal ribbon having its ends secured to plates, one of the plates being pivotally engaged with a lever securing member, and the other plate provided with an opening adapted to engage a stud on the lever, the stud pivoting the plate and the stud adapted to engage the other plate being spaced so that by turning the lever through an arc of substantially 180 degrees the band is placed around the receptacle to secure it in a closed position, the lever being provided with a hook to engage the band when in a secured position to prevent accidental or casual displacement of the free end of the lever.

The invention will be described in detail hereinafter and will be found illustrated in the accompanying drawings, in which Figure 1 is a plan view of the securing device showing it applied to a trunk, the trunk being broken away, Figure 2 is a longitudinal sectional view on a plane indicated by the line 2—2 of Figure 1, Figure 3 is a view of the securing means disconnected and in position for connection and tightening, Figure 4 is a sectional view on a plane indicated by the line 4—4 of Figure 1, Figure 5 is a view of a seal adapted to be used in connection with the securing device, and Figure 6 is a detail of a corner protecting member.

In the drawings similar reference characters are used to designate corresponding parts throughout the several views.

As heretofore suggested the device is adapted to be applied to trunks, suit cases, and the like, and in Figures 1 and 2 a trunk is suggested at A and has a band 1 engaged therearound and held in position by means of strap loops 2. The securing means for the ends of the band 1 comprises a lever 3 having spaced studs 4 and 5 and a plate 6 pivotally engaging stud 4 and provided with a plurality of transverse slots 7 through which one end of the band 1 is threaded as suggested at 8. 9 indicates another plate having a plurality of slots 10 through which the other end of the band 1 is threaded as suggested at 11, and is also provided with a key-hole slot 12 to receive the stud 5 when the parts are in the position shown in Figure 3, and by moving the lever through an arc of substantially 180 degrees the parts assume the position shown in Figures 1 and 2 thus tightening the band on the trunk or other receptacle. 13 indicates a hook member on the free end of the lever 3 that is adapted to engage band 1 when the parts are in securing position, and 14 indicates a flange also on the free end of the lever and on the edge opposite to the hook to prevent casual displacement of the lever relatively to the band. Flange 14 is provided with an opening 15 to receive a seal such as suggested in Figure 5 and comprising a wire member 16 and a disk 17 of soft metal having a V-shaped slot 18, the wire being adapted to be passed around the lever and band and through the opening 15 and then threaded through the V-shaped slot 18 preliminary to compression of the disk with a suitable sealing device commonly used for such purposes.

In using the securing means for suit cases and other receptacles having leather or other coverings that is easily scuffed and injured, it has been found necessary to employ shields for the corner of the receptacle as suggested in Figure 5 in which 19 designates the shield made of sheet metal or other suitable material and provided with slits 20 through which the band 1 is threaded, said disk 19 being adapted to be bent into rectangular shape as shown in Figure 6 to engage the corner of the suit case or other receptacle.

What is claimed is:—

1. A tie band securing device, comprising a lever having spaced studs adjacent to one of its ends, a plate pivotally engaging one of said studs and adapted to be secured to one end of a tie band, a plate to engage the other end of said band and having an opening therein to receive the other stud, a hook on one edge of the lever to engage the tie band and hold the lever in securing position, and a flange on the other edge of the lever and extending across the opening to the hook.

2. A tie band securing device, comprising a lever having spaced studs adjacent to one of its ends, a tie band having its ends engageable with said studs, a hook on one edge of the lever to engage the tie band, and a flange in the opposite edge of the lever and extending across the opening to the hook.

In testimony whereof I affix my signature.

SAMUEL G. JOHNSON.